(12) United States Patent
Onoda

(10) Patent No.: US 9,680,184 B2
(45) Date of Patent: Jun. 13, 2017

(54) NON-AQUEOUS SECONDARY BATTERY AND METHOD FOR PRODUCING SAME

(71) Applicant: TOYOTA JIDOSHA KABUSHIKI KAISHA, Toyota-shi, Aichi (JP)

(72) Inventor: Yusuke Onoda, Toyota (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 81 days.

(21) Appl. No.: 14/863,967

(22) Filed: Sep. 24, 2015

(65) Prior Publication Data

US 2016/0099485 A1 Apr. 7, 2016

(30) Foreign Application Priority Data

Oct. 3, 2014 (JP) ................................ 2014-204684

(51) Int. Cl.
*H01M 10/0567* (2010.01)
*H01M 10/0525* (2010.01)
*H01M 4/04* (2006.01)
*H01M 4/1397* (2010.01)
*H01M 4/36* (2006.01)
*H01M 4/62* (2006.01)

(52) U.S. Cl.
CPC ..... *H01M 10/0567* (2013.01); *H01M 4/0447* (2013.01); *H01M 4/1397* (2013.01); *H01M 4/366* (2013.01); *H01M 4/628* (2013.01); *H01M 10/0525* (2013.01)

(58) Field of Classification Search
CPC ......... H01M 10/0567; H01M 10/0525; H01M 4/0447; H01M 4/1397; H01M 4/366; H01M 4/628
See application file for complete search history.

(56) References Cited

U.S. PATENT DOCUMENTS 6,489,056 B1 12/2002 Davis et al.

FOREIGN PATENT DOCUMENTS

| JP | 2004-509445 A | 3/2004 |
| JP | 2008-004503 A | 1/2008 |
| JP | 2014-082118 A | 5/2014 |
| JP | 2014-107020 A | 6/2014 |
| WO | 2014/024990 A1 | 2/2014 |

*Primary Examiner* — Jane Rhee
(74) *Attorney, Agent, or Firm* — Sughrue Mion, PLLC

(57) ABSTRACT

An easier method is provided for producing a battery comprising an oxalato complex-derived coating on the negative electrode. This invention provides a method for producing a non-aqueous secondary battery, the method comprising: preparing a negative electrode paste comprising a negative electrode active material, a binder, and a polycarboxylic acid-based gas formation inhibitor; fabricating a negative electrode by applying the negative electrode paste to a negative current collector surface; constructing an assembly with a positive electrode, the negative electrode, and a non-aqueous electrolyte solution comprising an oxalato complex; and subjecting the assembly to activation thereby to decompose the oxalato complex and forming a coating derived from the oxalato complex on the negative electrode surface while inhibiting gas formation with the gas formation inhibitor.

11 Claims, 4 Drawing Sheets

NON-AQUEOUS SECONDARY BATTERY AND METHOD FOR PRODUCING SAME

TECHNICAL FIELD

The present invention relates to a non-aqueous secondary battery. In particular, it relates to a non-aqueous secondary battery having a coating derived from an oxalato complex on the negative electrode.

The present application claims priority to Japanese Patent Application No. 2014-204684 filed on Oct. 3, 2014, the entire contents of which are incorporated herein by reference.

BACKGROUND ART

In producing a non-aqueous secondary battery such as a lithium-ion secondary battery, etc., for instance, a positive electrode, a negative electrode and a non-aqueous electrolyte solution are assembled and the assembly is then subjected to an activation process. For instance, Patent Document 1 discloses a method for producing a lithium-ion secondary battery comprising lithium bis(oxalato)borate (LiBOB, $Li[B(C_2O_4)_2]$) in a non-aqueous electrolyte solution. The production method comprises an aging step where, after an initial charge, a sealed battery case is stored in a high-temperature environment; a degassing step where the aged battery case is unsealed; and a final sealing step where the degassed battery case is sealed again.

CITATION LIST

Patent Literature

[Patent Document 1] Japanese Patent Application Publication No. 2014-107020
[Patent Document 2] Japanese Patent Application Publication No. 2014-082118
[Patent Document 3] Japanese Patent Application Publication No. 2004-509445

SUMMARY OF INVENTION

When a battery contains an oxalato complex such as LiBOB, etc.; during initial charging and aging (or altogether an "activation process" hereinafter), the oxalato complex undergoes reductive decomposition. A coating comprising the oxalato complex is then formed on the negative electrode surface. During this, some of oxalate ions ($C_2O_4^{2-}$) decompose to form a gas (e.g. carbon dioxide). In the production method of Patent Document 1, after aging, the gas is discharged to reduce the battery's internal pressure to prevent an increase in the internal pressure of the battery while in use.

From the standpoint of the productivity, work efficiency and costs, however, an easier production method (requiring no degassing step) is in need.

The present invention has been made from such a viewpoint and an objective thereof is to provide an easier method for producing a battery having an oxalato complex-derived coating on the negative electrode. Another related objective is to provide a non-aqueous secondary battery obtained by the production method.

The present inventor has conducted many studies from various angles to solve the problem and as a result, has conceived of inhibiting the gas formation itself. Upon many more earnest studies, the present invention has been completed.

The present invention provides a method for producing a non-aqueous secondary battery, the method comprising the following steps:
(1) preparing a negative electrode paste (mixture) comprising a negative electrode active material, a binder, and a polycarboxylic acid-based gas formation inhibitor;
(2) fabricating a negative electrode by applying the negative electrode paste to a surface of a negative current collector;
(3) constructing an assembly with a positive electrode, the negative electrode, and a non-aqueous electrolyte solution comprising an oxalato complex; and
(4) subjecting the assembly to an activation process thereby to decompose the oxalato complex and forming a coating derived from the oxalato complex on a surface of the negative electrode while inhibiting gas formation by the effect of the gas formation inhibitor.

The inclusion of the gas formation inhibitor in the negative electrode can efficiently reduce the amount of gas formed in the activation process. This allows omitting a degassing step after the activation process. As a result, a battery having an oxalato complex-derived coating on the negative electrode can be produced more easily.

In a preferable embodiment of the production method disclosed herein, the gas formation inhibitor is included in 0.1 part by mass or more relative to 100 parts by mass of the negative electrode active material. This can make the effect of the present invention more significant.

In a preferable embodiment of the production method disclosed herein, the gas formation inhibitor is included in 0.3 part by mass or less relative to 100 parts by mass of the negative electrode active material. This can keep the battery resistance at a low level. Accordingly, excellent input/output performance can be produced.

A preferable gas formation inhibitor has a weight average molecular weight of 1000 to 20000 based on gel chromatography. By this, the effect of the present invention can be stably produced at a higher level.

As the negative electrode active material, a graphitic carbon material can be preferably used. This can preferably increase the capacity (e.g. energy density). When a graphitic carbon material is used as the negative electrode active material, a larger amount of gas tends to be formed in the activation process. Thus, it is particularly effective to apply the present invention.

As the binder, a rubber and a cellulose-based polymer can be preferably used. The combined use of two species of binder can lead to yet greater durability (e.g. greater retention of high-rate charge/discharge cycle characteristics).

In a preferable embodiment of the production method disclosed herein, the preparing the negative electrode paste (1) includes the following steps: (1a) a first mixing step where the negative electrode active material and the gas formation inhibitor are mixed; (1b) a second mixing step where the cellulose-based polymer is added to the first mixture obtained in the first mixing step and further mixed; and (1c) a third mixing step where the rubber is added to the second mixture obtained in the second mixing step and further mixed.

According to such a method, the dispersibility of the negative electrode paste can be increased. In other words, the negative electrode paste can be dispersed more evenly. Thus, more uniform negative electrode paste can be prepared. This can lead to high levels of battery properties (e.g. high energy density, high power density) that last stably over a long period.

In a preferable embodiment of the production method disclosed herein, as the oxalato complex, lithium bis(oxalato)borate (LiBOB) and/or lithium difluorobis(oxalato)phosphate (LPFO) is used. This can make the effect of the present invention more significant. The amount of the oxalato complex added to the non-aqueous electrolyte solution can be 0.3% by mass or greater. By this, highly durable batteries can be obtained more consistently.

In another aspect, the present invention provides a non-aqueous secondary battery comprising a positive electrode, a negative electrode and a non-aqueous electrolyte solution. The negative electrode comprises a negative electrode active material, a binder, a polycarboxylic acid-based gas formation inhibitor and has an oxalato complex-derived coating on a surface of the negative electrode. Such a non-aqueous secondary battery can bring about mass productivity and low costs combined with battery properties at a high level.

In a preferable embodiment of the non-aqueous secondary battery disclosed herein, the non-aqueous electrolyte solution comprises an oxalato complex. By this, for instance, even when cracking of the negative electrode active material and peeling of the negative electrode active material layer occur due to repetitive charge/discharge cycles, etc., a new coating can be formed on the exposed surface of the negative electrode (negative electrode active material). The gas formation associated with the decomposition of the oxalato complex can be preferably inhibited as well.

In a preferable embodiment of the non-aqueous secondary battery disclosed herein, the gas formation inhibitor content is 0.1 part by mass or greater, but 0.3 part by mass or less to 100 parts by mass of the negative electrode active material. By this, the effect to inhibit gas formation can be combined with excellent input/output performance at a higher level.

DESCRIPTION OF EMBODIMENTS

Preferred embodiments of the present invention are described below. Matters (battery components not characterizing this invention, general manufacturing process, etc.) necessary to practice this invention other than those specifically referred to in this description may be considered as design matters based on the conventional art in the pertinent field to a person of ordinary skill in the art. The present invention can be practiced based on the contents disclosed in this description and common technical knowledge in the subject field.

<<Production Method for Non-Aqueous Secondary Battery>>

Figure 1:
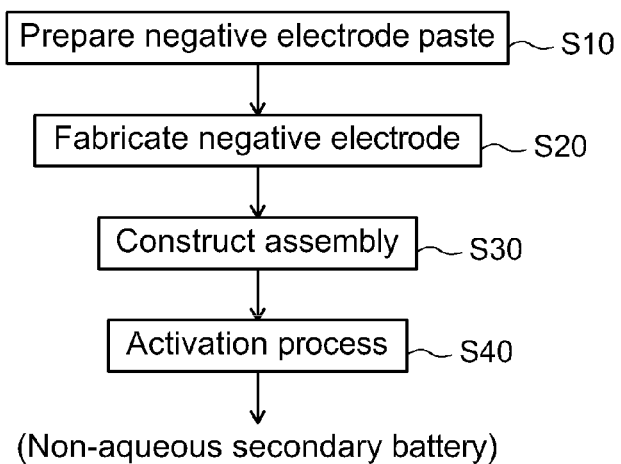
FIG. 1 shows a flow chart of the production method according to an embodiment.

FIG. 1 shows a flow chart of the production method according to an embodiment of the present invention. As shown in FIG. 1, the non-aqueous secondary battery production method disclosed herein generally comprises: (S10) preparing a negative electrode paste; (S20) fabricating a negative electrode; (S30) constructing an assembly; and (S40) an activation process. In addition to these steps, another step may be included at an arbitrary stage. The respective steps are described in order below.

(S10) Preparation of Negative Electrode Paste

In the production method disclosed herein, a negative electrode paste is first prepared, comprising a negative electrode active material, a binder, a gas formation inhibitor, and typically further a solvent. The method for preparing the negative electrode paste is not particularly limited besides the addition of the gas formation inhibitor and can be carried out in a conventional manner. For instance, the negative electrode active material, binder and gas formation inhibitor as well as other materials added as necessary are mixed in a suitable solvent to prepare a paste or slurry.

As the negative electrode active material, one, two or more species can be used among various materials known to be usable as negative electrode active materials in non-aqueous secondary batteries. Preferable examples include graphite, hard-to-graphitize carbon (hard carbon), easy-to-graphitize carbon (soft carbon), a carbon material (e.g. graphite with amorphous coating) and the like. In particular, from the standpoint of obtaining a battery with a high energy density, a graphitic carbon material is preferably used. When a graphitic carbon material is used, a larger amount of gas tends to be formed in the activation process. Thus, it is particularly effective to apply this invention. In this description, the term "graphitic carbon material" collectively refers to a carbon material formed solely of graphite and a carbon material formed of 50% by mass or more graphite (typically 80% by mass or more, e.g. 90% by mass or more graphite).

The properties of the negative electrode active material are not particularly limited and can be suitably selected in accordance with the purpose, etc.

For instance, from the standpoint of the handling properties and productivity or in view of reducing side reactions in the battery, the average particle diameter by volume based on laser diffraction/light scattering can be typically 1 μm or larger, preferably 5 μm or larger, or more preferably 10 μm or larger. From the standpoint of stably obtaining greater battery properties (higher energy density, higher power density), the average particle diameter can be generally 50 μm or smaller, preferably 30 μm or smaller, or more preferably 20 μm or smaller, for instance, 15 μm or smaller. For example, the specific surface area based on the BET method can be typically 0.1 $m^2/g$ or higher (preferably 2 $m^2/g$ or higher, more preferably 3 $m^2/g$ or higher), but 10 $m^2/g$ or lower (preferably 6 $m^2/g$ or lower, more preferably 4.5 $m^2/g$ or lower).

As the binder, one, two or more species can be used among various materials known to be usable as binders for negative electrodes in non-aqueous secondary batteries.

Preferable examples include rubbers such as styrene-butadiene rubber (SBR), acrylonitrile-butadiene copolymer rubber (NBR), acrylonitrile-isoprene copolymer rubber (NIR), acrylonitrile-butadiene-isoprene copolymer rubber (NBIR), etc.; cellulose-based polymers such as carboxymethyl cellulose (CMC), methyl cellulose (MC), etc.; halogenated vinyl resins such as polyvinylidene fluoride (PVdF), polytetrafluoroethylene (PTFE), etc.; polyoxyalkylene oxides such as polyethylene oxide (PEO), etc. In particular, from the standpoint of obtaining a highly durable battery, it is preferable to use a cellulose-based polymer in combination with a rubber.

The amount of binder added is not particularly limited. In a preferable embodiment, it is 0.3 part by mass or greater (preferably 0.5 part by mass or greater), but 10 parts by mass or less (preferably 5 parts by mass or less) to 100 parts by mass of the negative electrode active material. This preferably ensures the mechanical strength (shape-holding ability) of the negative electrode active material layer, bringing about great durability. It is also effective in keeping the resistance at a low level.

When two or more species of binder are used together, their mixing ratio is not particularly limited and can be suitably adjusted in accordance with the properties of the binders used. For instance, when a rubber and a cellulose-based polymer are used in combination, the ratio of amount Mc of cellulose-based polymer added to amount Mg of rubber added—Mc/Mg—can be about 1 (e.g. 1±0.1).

As the gas formation inhibitor, a (bifunctional or higher multifunctional) polycarboxylic acid-based compound having two or more carboxyl groups (—C(=O)OH groups) in the molecule, a derivative thereof, or a salt thereof can be used. These compounds can be used singly as one species or in a combination of two or more species. According to the studies by the present inventors, the active carboxyl groups work in some way to reduce the amount of gas formed in the battery during the activation process step described later.

The properties of the polycarboxylic acid-based compound are not particularly limited and can be suitably selected in accordance with the other materials (e.g. binder, solvent) to be used, etc. For instance, from the standpoint of maximizing the effect of the present invention, the number of carboxyl groups per molecule of polycarboxylic acid-based compound is two or greater, typically three or greater, or preferably one hundred or greater. For example, from the standpoint of maximizing the effect of this invention, the weight average molecular weight of the polycarboxylic acid-based compound can be about 1000 to 20000. In particular, it is preferably 5000 to 15000, for instance, about 10000 to 15000. The weight average molecular weight can be measured by general gel permeation chromatography (GPC). The polycarboxylid acid-based compound can be water-soluble (hydrophilic) or water-insoluble (lipophilic). From the standpoint of the workability, etc., it is preferably water-soluble.

Specific examples of the polycarboxylic acid-based compound include aliphatic saturated polycarboxylic acids such as oxalic acid, malonic acid, succinic acid, adipic acid, azelaic acid, sebacid acid, etc.; aliphatic unsaturated polycarboxylic acids such as acrylic acid, methacrylic acid, maleic acid, fumaric acid, itaconic acid, sorbic acid, etc.; aromatic polycarboxylic acids such as phthalic acid, isophthalic acid, terephthalic acid, carboxyphenylacetic acid, etc.; and their derivatives and salts, etc. Particularly preferable species include aliphatic unsaturated polycarboxylic acids, for instance, vinyl group-containing acrylic acid and methacrylic acid as well as their derivatives and salts.

It is also preferable to use a homopolymer of an aforementioned aliphatic unsaturated carboxylic acid (monomer) or its ester, or a copolymer of two or more species of aliphatic unsaturated carboxylic acids (monomers) or esters thereof. A copolymer of a carboxyl group-containing monomer and another copolymerizable monomer can be preferably used as well. For instance, as shown in the working examples described later, a compound having a structure that has multiple side chains attached to a main chain polymer, with the side chains having approximately the same length (e.g. within ±5 carbon atoms) with a carboxyl group at each side-chain terminus. The carboxyl groups at the side-chain termini further increase the effect to inhibit gas formation. Thus, the effect of this invention can be produced at a high level. In particular, an acrylic polymer comprising a repeat unit derived from at least either acrylic acid or methacrylic acid is preferable, with examples including polyacrylic acid, polyacrylic acid salt (polyacrylate), polyacrylic acid ester, polymethacrylic acid, polymethacrylic acid salt, polymethacyrlic acid ester, polymaleic acid, polyphthalic acid, acrylic acid/sulfonic acid copolymer, etc.

Examples of a salt of the polycarboxylic acid-based compound include alkali metal salts such as sodium salts, etc.

The amount of polycarboxylic acid added is not particularly limited. To obtain a higher level of the effect of this invention, it can be 0.01 part by mass or greater (preferably 0.1 part by mass or greater) to 100 parts by mass of the negative electrode active material. To keep the negative electrode resistance at a low level, it can be 0.5 part by mass or less (preferably 0.3 part by mass or less) to 100 parts by mass of the negative electrode active material. This can effectively reduce the amount of gas formed in the battery production without impairing the battery properties (e.g. input/output performance in a low temperature environment at or below 0° C.).

The solvent is not particularly limited as long as it allows uniform dispersion or dissolution of the materials. A preferable example is water or a solvent mixture primarily comprising water. As for the other solvent(s) forming the solvent mixture besides water, one, two or more species of water-miscible organic solvent (e.g. lower alcohol, lower ketone, etc.) can be suitably selected and used. In particular, an aqueous solvent formed of 80% by mass or more water (preferably 90% by mass or more, more preferably 95% by mass or more water) is preferable.

In a preferable embodiment, the negative electrode paste can be prepared in stages as follows: In particular, the negative electrode active material and the gas formation inhibitor are first mixed in the solvent. Subsequently, to the resulting mixture, the binder is added and further mixed. For instance, when two or more species of materials are used as the binder, the following steps are preferably included: (1a) a first mixing step where the negative electrode active material and the gas formation inhibitor are mixed; (1b) a second mixing step where a first binder (e.g. a cellulose-based polymer) is added to the first mixture obtained in the first mixing step and further mixed; (1c) a third mixing step where a second binder (e.g. a rubber) is added to the second mixture obtained in the second mixing step and further mixed.

In the first mixing step, the negative electrode active material and the gas formation inhibitor are mixed well to allow the gas formation inhibitor to tightly bind to the surface of the negative electrode active material. This can further increase the dispersibility of the negative electrode active material in the solvent. In other words, the gas formation inhibitor can serve also as a so-called dispersing agent. As a result, more uniform negative electrode paste can be prepared.

(S20) Fabrication of Negative Electrode

In the production method disclosed herein, the resulting negative electrode paste is used to form a negative electrode active material layer. Typically, the negative electrode paste is applied to a surface of a negative current collector and then allowed to dry to remove the solvent. Application of the negative electrode paste or removal of the solvent can be carried out in the same manner as the conventional methods. As the negative current collector, a conductive material formed of a highly conductive metal (e.g. copper, nickel, etc.) can be preferably used.

The negative electrode active material content in the total non-volatile content of the negative electrode active material layer is usually suitably about 80% by mass or higher, or typically 80 to 99% by mass, for instance, preferably 90 to 98% by mass. The gas formation inhibitor content in the total non-volatile content of the negative electrode active material layer is, for instance, suitably 0.01% by mass or higher, typically 0.01 to 0.5% by mass, for instance, preferably 0.1 to 0.3% by mass. The binder content in the total non-volatile content of the negative electrode active material layer is usually suitably about 0.5 to 10% by mass, for instance, preferably 1 to 5% by mass.

The properties of the negative electrode active material layer are not particularly limited. From the standpoint of combining high energy density and high power density, the mass (coating weight) of the negative electrode active material layer per unit area of negative current collector can be, for instance, 2 mg/cm$^2$ or greater, preferably 3 mg/cm$^2$ or greater, but 30 mg/cm$^2$ or less, for instance, 20 mg/cm$^2$ or less.

A negative electrode can be thus fabricated, comprising a negative current collector, a negative electrode active material layer fixed to a surface of the negative current collector.

(S30) Construction of Assembly

In the production method disclosed herein, an assembly is constructed next. This step typically includes obtaining a positive electrode, obtaining a non-aqueous electrolyte solution, and assembling the positive electrode, the negative electrode and the non-aqueous electrolyte solution.

The positive electrode comprises, for instance, a positive current collector and a positive electrode active material layer fixed to the positive current collector. As the positive current collector, a conductive material formed of a highly conductive metal (e.g. aluminum, nickel, etc.) can be preferably used.

The positive electrode active material layer comprises at least a positive electrode active material. As the positive electrode active material, one, two or more species can be used among various materials known to be usable as positive electrode active materials in non-aqueous secondary batteries. Preferable examples include layered and spinel lithium composite metal oxides (e.g. $LiNiO_2$, $LiCoO_2$, $LiFeO_2$, $LiMn_2O_4$, $LiNi_{1/3}Co_{1/3}Mn_{1/3}O_2$, $LiNi_{0.5}Mn_{1.5}O_4$, $LiFePO_4$, etc.). In particular, from the standpoint of the thermal stability and energy density, a lithium nickel cobalt manganese composite oxide having a layered structure is preferable. In addition to the positive electrode active material, the positive electrode active material layer may comprise as necessary one, two or more species of materials that can be used as components of positive electrode active material layers in general non-aqueous secondary batteries. Typical examples of such materials include a conductive material and a binder. Examples of the conductive material include carbon materials such as carbon black (e.g. acetylene black, ketjen black), activated carbon, graphite, carbon fiber, etc. Examples of the binder include those listed for use in forming the negative electrode active material layer.

The non-aqueous electrolyte solution can be obtained by adding a supporting salt and an oxalato complex to a non-aqueous solvent and mixing them to uniformity. As the non-aqueous solvent, various organic solvents used for non-aqueous electrolyte solutions in general non-aqueous secondary batteries can be used, with examples including carbonates, ethers, esters, nitriles, sulfones, lactones, etc. Preferable examples include ethylene carbonate (EC), propylene carbonate (PC), diethyl carbonate (DEC), dimethyl carbonate (DMC), ethyl methyl carbonate (EMC), and the like. These non-aqueous solvents can be used singly as one species or in a combination of two or more species. As the supporting salt, one, two or more species can be used among various compounds known to be usable as supporting salts for non-aqueous secondary batteries. Preferable examples include lithium salts such as $LiPF_6$, $LiBF_4$, $LiClO_4$, $LiAsF_6$, $Li(CF_3SO_2)_2N$, $LiCF_3SO_3$, etc. In particular, $LiPF_6$ is preferable. The concentration of the supporting salt can be, for instance, about 0.7 mol/L to 1.3 mol/L (e.g. 0.9 mol/L to 1.2 mol/L) in the non-aqueous electrolyte solution.

As the oxalato complex, solely one species or a combination of two or more species can be used among those prepared by various known methods, various generally available products, etc., without particular limitations. The oxalato complex comprises a complex formed with at least one oxalate ion ($C_2O_4^{2-}$) coordinating a central atom. Examples of the central atom include boron (B) and phosphorous (P), etc. Specific examples include (i) a compound having a tetracoordinate structure where a boron (B) as the central atom is coordinated with at least one oxalate ion ($C_2O_4^{2-}$); (ii) a compound having a hexacoordinate structure where a phosphorous (P) as the central atom is coordinated with at least one oxalate ion ($C_2O_4^{2-}$); and the like. Among them, a compound comprising the same cation species (charge carrier ion) as the supporting salt is especially preferable.

Preferable examples of the compound (i) include lithium bis(oxalato)borate ($Li[B(C_2O_4)_2]$, LiBOB), lithium difluoro (oxalato)borate ($Li[BF_2(C_2O_4)]$, LBFO) and the like. Preferable examples of the compound (ii) include lithium tetrafluoro(oxalato)phosphate ($Li[PF_4(C_2O_4)]$), lithium difluorobis(oxalato)phosphate ($Li[PF_2(C_2O_4)_2]$, LPFO), lithium tris(oxalato)phosphate($Li[P(C_2O_4)_3]$), etc. In particular, from the standpoint of greatly reducing unevenness in coating formation, a compound having two oxalate ions such as LiBOB and LPFO is preferable.

The oxalato complex is included to form a coating on the negative electrode surface in the activation process described later. Thus, the concentration of the oxalato complex may vary depending on, for instance, the type and properties (e.g. particle diameter, specific surface area), etc., of negative electrode active material. In a preferable embodiment, it can be about 0.05% by mass or higher, preferably 0.1% by mass or higher, more preferably 0.2% by mass or higher, or particularly preferably 0.3% by mass or higher of the non-aqueous electrolyte solution. From the standpoint of minimizing the increase of resistance, the upper limit of oxalato complex content can be usually 2% by mass or less, for instance, 1% by mass or less. This can bring about a battery with lower resistance and higher durability.

The non-aqueous electrolyte solution can further comprise as necessary various additives in addition to the components described above as far as the effect of the present invention is not impaired. Such additives can be used for one, two or more purposes, such as for increasing the cycle characteristics of the battery, increasing the storability at a high temperature, increasing the initial charging/discharging efficiency, increasing the input/output performance, increasing the overcharge endurance (increasing the amount of gas formed when overcharged), and so on. Specific examples include vinylene carbonate (VC), vinylethylene carbonate (VEC), biphenyl (BP), cyclohexylbenzene (CHB), etc.

The positive electrode, the negative electrode and the non-aqueous electrolyte solution are used to form an assembly. In a preferable embodiment, the positive and negative electrodes are placed opposite in an insulated state and placed in a battery case. The non-aqueous electrolyte solution is then injected into the battery case. As the battery case, for instance, a case made of a lightweight metal such as aluminum, steel, etc., can be preferably used. The battery case (external shape of the container) can have various shapes such as circular (circular cylindrical, coin-shaped, button-shaped), hexahedral (cuboid, cubic), processed/modified shapes of these, and so on.

The "assembly" in this description generally refers to an assembled structure at a stage preceding the activation process described later. For instance, the lid of the battery case or the injection hole for the electrolyte solution may be closed already or not yet. In the art disclosed herein, the battery's internal pressure is less likely to increase even in the activation process described later. Accordingly, after this step (construction of the assembly), the lid of the battery case or the injection hole for the electrolyte solution can be even completely sealed (final sealing). In such a case, the battery case may be sealed in a negative pressure state. This can increase the workability and ease of operation in the activation process step.

(S40) Activation Process

In the production method disclosed herein, the constructed assembly is then subjected to an activation process. The activation process typically includes initial charging (conditioning) to charge the assembly at least once and aging to store the assembly after the initial charging in a high temperature range for a prescribed time period.

In the initial charging, the positive and negative electrodes are connected via an external power source and current is allowed to flow until the voltage across the two electrodes reaches a certain value. The charging can be carried out in constant-current charging (CC charging) mode where the charging is performed at a constant current or in constant-current constant-voltage charging (CCCV charging) mode where after CC charging, the charging is maintained at a certain voltage for a certain time period. From the standpoint of increasing the productivity and forming a coating of uniform quality on the negative electrode surface, the rate of current flow can be usually 0.1 C or higher, but 10 C or lower (preferably 8 C or lower). While the termination voltage may vary depending on the types of oxalato complex and active materials, etc., for instance, the voltage can be usually at a value likely shown when the assembly is at or above approximately 80% SOC (typically in a range of 90 to 105% SOC). For example, with respect to a battery that is fully charged at 4.2 V, it can be about 3.8 V to 4.2 V. The initial charging can be performed once, or, for instance, twice or more with discharging in-between.

For aging, the initially-charged assembly is heated to a high temperature at or above 40° C. (e.g. 40° C. to 80° C., preferably 50° C. to 70° C., more preferably 55° C. to 65° C.) and stored (left standing) in an environment at the same temperature for a certain time period. The assembly can be heated and stored by conventional means. While it depends on the temperature setting, etc., the storage time can be usually about several hours. For instance, the total time from the start of heating can be 1 to 100 hours, preferably about 10 to 48 hours. During the aging, the battery voltage can be maintained at about the same value as the termination voltage for the initial charging (e.g. around the termination voltage for initial charging ±0.1 V).

In the activation process, the oxalato complex is electrically decomposed (typically undergoes reductive decomposition at the negative electrode). A coating is then formed on the negative electrode surface, comprising decomposition products (e.g. oxalate ions) of the oxalato complex. This stabilizes the interface between the negative electrode active material and non-aqueous electrolyte solution and inhibits further reductive decomposition of the non-aqueous electrolyte solution during charging and discharging. As a result, a battery can be obtained with excellent durability.

In the formation of the coating, some of the oxalate ions decompose to form a gas (e.g. carbon dioxide). Thus, in the conventional art, it has been necessary to unseal the battery after activation and discharge the gas formed to reduce the battery's internal pressure. On the contrary, in the art disclosed herein, the gas formation inhibitor in the negative electrode reduces the amount of gas formed in the activation process. For instance, as compared with a battery using a conventional negative electrode (free of a gas formation inhibitor), the amount of gas formed can be reduced to half or less. As a result, the degassing step after the activation process can be omitted. Thus, a battery comprising an oxalato complex-derived coating on the negative electrode can be produced more easily.

According to the studies by the present inventors, the effect to reduce gas formation as described above is not produced when using, for instance, an alkyl sulfate ester salt having a sulfate group at the terminus of a hydrocarbon group or a quaternary ammonium salt. On the contrary, in such a case, the amount of gas formed may rather increase. Use of a fatty acid soap having a carboxylate group at the terminus of a hydrocarbon group yields little (extremely poor) effect to reduce gas formation. In other words, from the standpoint of reducing gas formation in the activation process, the polycarboxylic acid-based compound disclosed herein can be particularly advantageous. While its mechanism is unknown, a possibility is that, for instance, the oxalate ions formed by decomposition of the oxalato complex interact in some way with the polycarboxylic acid-based compound, thereby serving to inhibit oxidation of the oxalate ions. In other words, it is presumed that the polycarboxylic acid-based compound serves as so-called antioxidant.

<<Non-Aqueous Secondary Battery>>

The present invention also provides a non-aqueous secondary battery. The non-aqueous secondary battery comprises a positive electrode, a negative electrode, and a non-aqueous electrolyte solution. The negative electrode of the battery comprises a negative electrode active material, a binder, and a polycarboxylic acid-based gas formation inhibitor and has a coating derived of an oxalato complex.

Described below is the non-aqueous secondary battery according to, but not particularly limited to, an embodiment of the present invention with suitable reference to drawings. In the drawings referenced below, a common reference numeral may be assigned to members or sites producing the same effects, and duplicated descriptions are sometimes omitted or simplified. The dimensional relationship (length, width, thickness, etc.) in each drawing does not necessarily represent the actual dimensional relationship.

Figure 2:
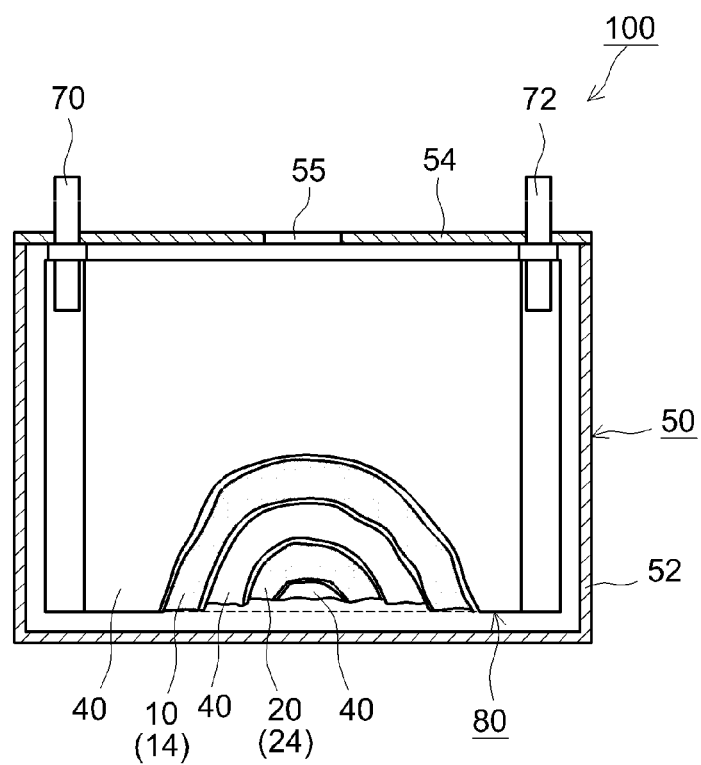
FIG. 2 shows a longitudinal section view of the non-aqueous secondary battery according to an embodiment.

FIG. 2 shows a longitudinal section view schematically illustrating a cross-sectional structure of a non-aqueous secondary battery 100 according to an embodiment of the present invention. Non-aqueous secondary battery 100 has a construction where a flat, wound electrode body 80 and a non-aqueous electrolyte solution not shown in the drawing are placed in a flat, box-shaped battery case 50.

Battery case 50 comprises a flat box-shaped main battery casing 52 having a top opening and further comprises a lid 54 to close the opening. The top face (i.e. lid 54) of battery case 50 comprises a positive terminal 70 for external connection to make electrical connection to the positive electrode of wound electrode body 80 and a negative terminal 72 to make electrical connection to the negative electrode of wound electrode body 80. Similarly to a battery case of a conventional non-aqueous secondary battery, lid 54 comprises a safety valve 55 to discharge the gas produced inside battery case 50 to the outside.

Wound electrode body 80 is formed by layering a long positive electrode sheet 10 and a long negative electrode sheet 20 and winding the layers into a flat shape. Positive electrode sheet 10 comprises a long sheet of positive current collector and a positive electrode active material layer 14 formed along the length direction on at least one (typically each) face thereof. Negative electrode sheet 20 comprises a long sheet of negative current collector and a negative electrode active material layer 24 formed along the length direction on at least one (typically each) face thereof. Between positive electrode active material layer 14 and negative electrode active material layer 24, two long separator sheets 40 are placed as insulating layers to prevent direct contacts between the two. As the separator sheet 40, for instance, a porous resin sheet formed of a resin such as polyethylene (PE), polypropylene (PP), etc., can be used.

In the central region of the width direction of wound electrode body 80, a wound core is formed with tightly overlapping positive electrode active material layer 14 formed on the positive current collector surface and negative electrode active material layer 24 formed on the negative current collector surface. At the two ends of the width direction of wound electrode body 80, a positive electrode active material layer-free region of positive electrode sheet 10 and a negative electrode active material layer-free region of negative electrode sheet 20 protrude out of the wound core. The positive current collector is present at the positive electrode-side protrusion and the negative current collector is present at the negative electrode-side protrusion, electrically connected to the positive terminal 70 and negative terminal 72, respectively.

The negative electrode active material layer 24 comprises a negative electrode active material, a binder and a gas formation inhibitor. These materials are just as described regarding the production method. From the standpoint of combining durability and high input/output performance at a high level, the binder content in negative electrode active material layer 24 can be 0.3 part by mass or greater (preferably 0.5 part by mass or greater), but 10 parts by mass or less (preferably 5 parts by mass or less) to 100 parts by mass of the negative electrode active material. From the standpoint of combining the effect of the present invention and high input/output performance at a high level, the gas formation inhibitor content in negative electrode active material layer 24 can be 0.01 part by mass or greater (preferably 0.1 part by mass or greater), but 0.5 part by mass or less (preferably 0.3 part by mass or less) to 100 parts by mass of the negative electrode active material.

On the surface of negative electrode active material layer 24 (typically the surface of the negative electrode active material), a coating is formed comprising a component derived from the oxalato complex. This stabilizes the interface between the negative electrode and the non-aqueous electrolyte solution. The presence of the oxalato complex-derived coating on the negative electrode can be assessed by various heretofore known structural analysis methods. Examples of usable methods include X-ray absorption fine structure (XAFS), time-of-flight secondary ion mass spectrometry (TOF-SIMS), x-ray photoelectron spectroscopy (XPS), etc. These analyses can yield data about the elemental composition and bonding of the outermost surface of negative electrode active material layer 24 to determine whether or not the surface of negative electrode active material layer 24 includes components (e.g. $C_2O_4^{2-}$, B, P) derived from an oxalato-chelate compound.

In a preferable embodiment, the oxalato complex (which can be in the form of oxalato complex ion) is still present in the non-aqueous electrolyte solution even after the assembly is activated (conditioned and initially charged). As described above, the oxalato complex added during battery construction is consumed to form the coating on the surface of the negative electrode (negative electrode active material layer). Thus, the oxalato complex in the non-aqueous electrolyte solution may disappear completely. However, if there is some oxalato complex remaining in the non-aqueous electrolyte solution, and when, for instance, unexpected cracking of the negative electrode active material or peeling of the negative electrode active material layer occur due to repeated charging/discharging cycles, a new coating can be advantageously formed on the exposed surface of the negative electrode (negative electrode active material). Furthermore, because the battery disclosed herein comprises the gas formation inhibitor in the negative electrode, the increase in the battery's internal pressure associated with the decomposition reaction of the oxalato complex can be greatly reduced.

In general, when a battery comprising an oxalato complex is exposed to a high temperature environment (e.g. when used or stored in a high temperature environment at or above 50° C.), there is a tendency toward gas formation in the battery. However, in the battery disclosed herein, for instance, gas formation can be preferably inhibited during normal use.

<<Applications of Non-Aqueous Secondary Battery>>

The non-aqueous secondary battery (which may be in the form of a battery pack) disclosed herein bring about mass productivity and reduced costs combined with battery properties (e.g. at least one of high energy density, high power density, or durability) at a high level. Thus, with the benefit of these characteristics, it can be preferably used, for instance, as a power source for a motor to drive a vehicle. The type of vehicle is not particularly limited. Examples include a plug-in hybrid automobile (PHV), hybrid automobile (HV), electric automobile (EV), electric track, electric scooter, electric-assist bicycle, electric wheel chair, electric train, and the like.

Several working examples related to the present invention are described below, but the present invention is not to be limited to these specific examples.

<I. Studies on Types of Gas Formation Inhibitor>

Herein, to examine compounds capable of serving as gas formation inhibitors, batteries were constructed with various additives included in negative electrodes and the amounts of gas formed in the activation process were compared In particular, as the additives, five different compounds were obtained as below.

Example 1: polycarboxylic acid A (branched random polymer having several side chains relative to its main chain polymer, with the side chains being approximately equal in length, each having a carboxyl group at the side-chain terminus, Mw 10000)

Example 2: polycarboxylic acid B (polyacrylic acid structure, Mw 12000)

Example 3: sodium lauryl sulfate

Example 4: fatty acid soap

Example 5: quaternary ammonium salt

[Fabrication of Negative Electrode Sheet]

Were obtained a graphitic carbon material (with natural graphite core, average particle diameter: 11.2 μm, specific surface area: 3.6 m$^2$/g) as a negative electrode active material, styrene-butadiene rubber (SBR) and carboxymethyl cellulose (CMC) as binders, and additives shown in Table 1. These materials were placed in a mixer at a mass ratio of 100:1:1:0.3 and mixed with a small amount of water while adjusting the viscosity to prepare negative electrode pastes (Examples 1 to 5). For a reference, a negative electrode paste (Example 0) free of an additive was prepared as well. These pastes were applied to surfaces of copper foil (negative current collector), dried to eliminate water and roll-pressed with a roll press machine to fabricate negative electrode sheets (Examples 0 to 5) having negative electrode active material layers placed on the negative current collectors.

[Fabrication of Positive Electrode Sheet]

Were obtained $LiNi_{0.33}Co_{0.33}Mn_{0.33}O_2$ powder (LNCM oxide) as a positive electrode active material, acetylene black (AB) as a conductive material, and polyvinylidene fluoride (PVdF) as a binder. These materials were placed in a mixer at a mass ratio of 91:6:3 and mixed with a small amount of N-methylpyrrolidone (MNP) while adjusting the viscosity to prepare a positive electrode paste. The paste was applied to surfaces of aluminum foil (positive current collector), dried to eliminate the solvent, and roll-pressed with a roll press machine to fabricate a positive electrode sheet having positive electrode active material layers placed on the positive current collector.

[Preparation of Non-Aqueous Electrolyte Solution]

A non-aqueous electrolyte solution was then prepared. In particular, in a solvent mixture of ethylene carbonate (EC), dimethyl carbonate (DMC) and ethyl methyl carbonate (EMC) at EC:DMC:EMC=3:4:3, $LiPF_6$ as a supporting salt was dissolved to 1.1 mol/L. Lithium bis(oxalato)borate (LiBOB) as an oxalato complex was further added to a 0.4% by mass content.

[Construction of Assembly]

The fabricated positive and negative electrode sheets were layered via separator sheets and wound to fabricate a flat wound electrode body. As the separator sheet, was used a commercial product having a PP/PE/PP three-layer structure in which polypropylene (PP) is layered on each face of polyethylene (PE). The wound electrode body was then placed along with the non-aqueous electrolyte solution in a laminate case and sealed. Assemblies (Examples 0 to 5) having a design capacity of 26 mAh were constructed in such a manner.

[Measurement of Amount Of Gas Formed]

From the change in volume of laminate cell before and after the activation process, the amount of gas was determined by the Alchimedes method. In particular, each laminate cell immediately after its construction was immersed in a container filled with a fluorinated inert liquid (Fluorinert (trademark) available from Sumitomo 3M), the cell's volume A (cm$^3$) was determined from the change in weight before and after the immersion. Subsequently, in an environment at 25° C., each cell was subjected to constant-current charging (CC charging) at a constant current of 1C until the voltage across the positive and negative electrodes reached 4.1 V (initial charging). The cell after the initial charging was measured for volume B (cm$^3$) in the same manner as above. By subtracting the volume A from the volume B (B−A (cm$^3$)), the amount of gas formed in the initial charging step was determined.

The laminate cell after the initial charging was then left standing in a thermostatic bath at 50° C. for 24 hours (aging). The volume C (cm$^3$) of the aged cell was measured in the same manner as above. By subtracting the volume B from the volume C (C−B (cm$^3$)), the amount of gas formed in the aging step was determined.

Figure 3:
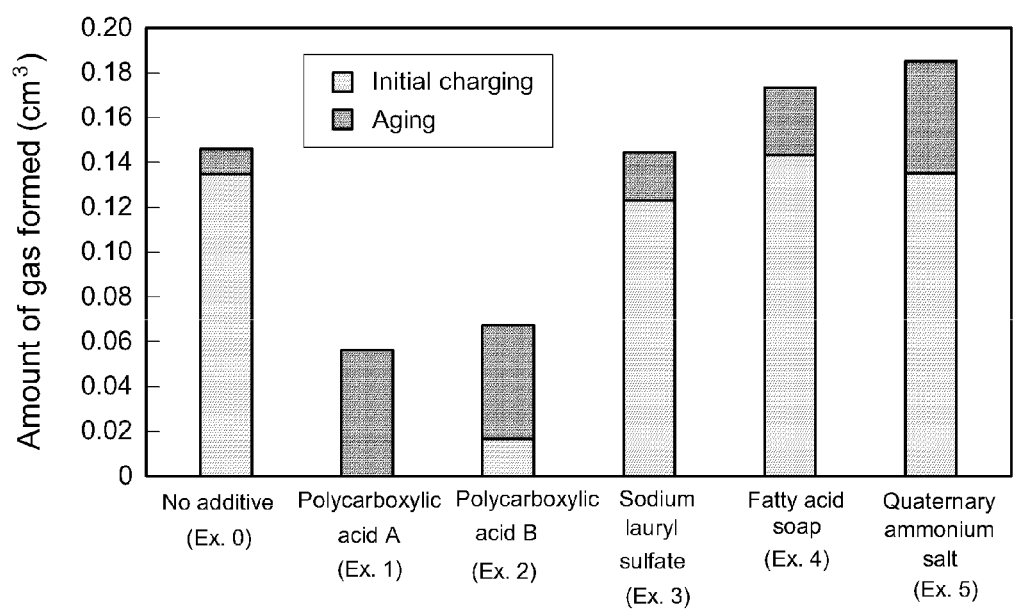
FIG. 3 shows a graph representing the relationship between the type of additive and the amount of gas formed when LiBOB was used as the oxalato complex.

FIG. 3 shows a graph representing the relationship between the type of additive and amount of gas formed in the activation process. As evident from FIG. 3, with respect to Example 0 without an additive in the negative electrode and Example 3 with sodium lauryl sulfate added in the negative electrode, approximately the same amount of gas was formed in the activation process. On the contrary, with respect to Example 4 supplemented with fatty acid soap and Example 5 supplemented with a quaternary ammonium salt, larger amounts of gas were formed in the activation process as compared with Example 0. Thus, it was found that these additives lacked the effect to inhibit gas formation, but rather serve as sources of gas formation. With respect to Example 4, the lack of the effect may be because only one carboxylate group (functional group) was present per molecule.

On the other hand, with respect to Examples 1 and 2 each supplemented with a polycarboxylic acid, significantly smaller amounts of gas were formed in the activation process as compared with Example 0. While no apparent reason can be given for this, it may be due to some sort of interactions between the carboxyl groups and oxalate ions formed upon decomposition of the oxalato complex.

<II. Studies on Amounts of Gas Formation Inhibitor>

In these studies, using the polycarboxylic acid A as the gas formation inhibitor, batteries were constructed, varied only by the amount of polycarboxylic acid A added, and the amounts of gas formed in the activation process were compared.

In particular, to 100 parts by mass of the negative electrode active material, the polycarboxylic acid A as the gas formation inhibitor was added in amounts of 0 part by mass (not added) (Example 6), 0.1 part by mass (Example 7), 0.3 part by mass (Example 8) and 1.0 part by mass (Example 9). Otherwise, in the same manner as for the studies I, assemblies were constructed and measured for the amounts of gas formed in the activation process.

Figure 4:
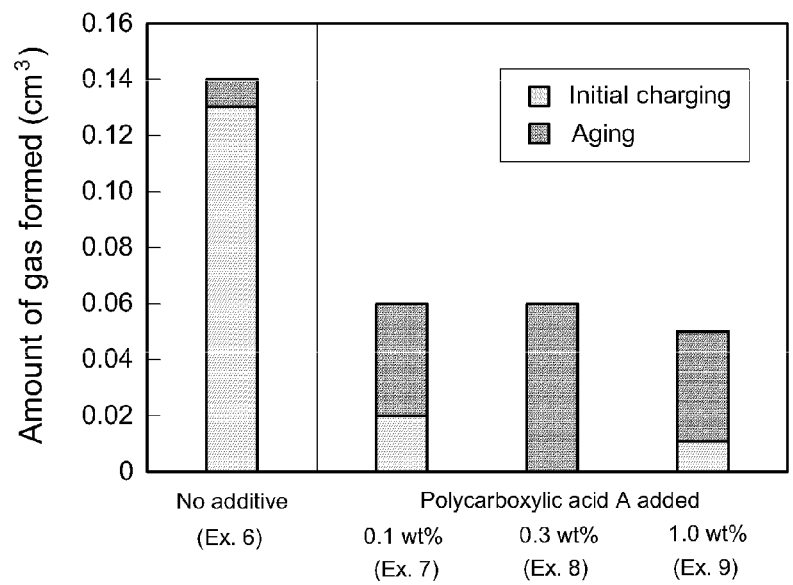
FIG. 4 shows a graph representing the relationship between the amount of gas formation inhibitor added and the amount of gas formed when LiBOB was used as the oxalato complex.

FIG. 4 shows a graph representing the relationship between the amount of gas formation inhibitor added and the amount of gas formed in the activation process. As evident from FIG. 4, when the amount of gas formation inhibitor added was 0.1 part by mass relative to the negative electrode active material, a significantly smaller amount of gas was formed in the activation process in this example.

[Measurement Of Resistance]

In an environment at a temperature of 25° C., activated batteries (Examples 6 to 9) were adjusted to 60% SOC. The batteries were set in a thermostatic bath at −30° C. and subjected to AC (alternate current) impedance measurements. The resistance (mΩ) was determined from the diameters of arcs in the resulting Cole-Cole plots. The results are shown in FIG. 5.

Figure 5:
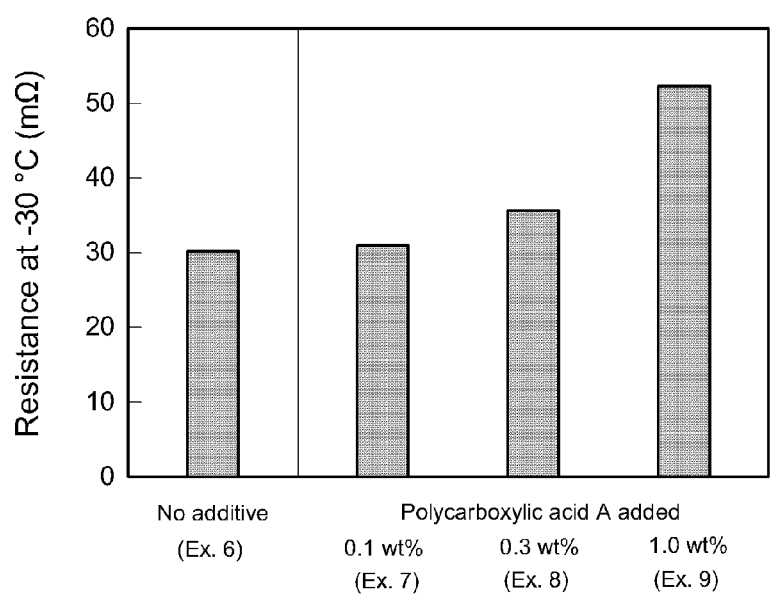
FIG. 5 shows a graph representing the relationship between the amount of gas formation inhibitor added and the battery resistance at −30° C. when LiBOB was used as the oxalato complex.

As evident from FIG. 5, with increasing amount of gas formation inhibitor added, the battery resistance had a tendency to increase. In other words, when the gas formation inhibitor was added in an amount of 1 part by mass or less (preferably 0.5 part by mass or less, more preferably 0.3 part by mass or less) relative to the negative electrode active material, the amount of gas formed during the battery production was reduced without impairing the battery properties (e.g. input/output performance in a low temperature environment at or below 0° C.) in this example.

<III. Studies on Types of Oxalato Complex>

In these studies, using lithium difluorobis(oxalato)phosphate (LPFO) as the oxalato complex, batteries were constructed, varied only by gas formation inhibitor species; and the amounts of gas formed in the activation process were compared.

In particular, a graphitic carbon material (average particle diameter: 10.8 µm, specific surface area: 3.8 m$^2$/g) was used as the negative electrode active material and LPFO was used as the oxalato complex. Otherwise in the same manner as for Examples 0 to 2 in the studies I, assemblies (Examples 10 to 12) were constructed and measured for the amounts of gas formed in the activation process. The activated batteries were measured also for the battery resistance in the same manner as for the studies II.

Figure 6:
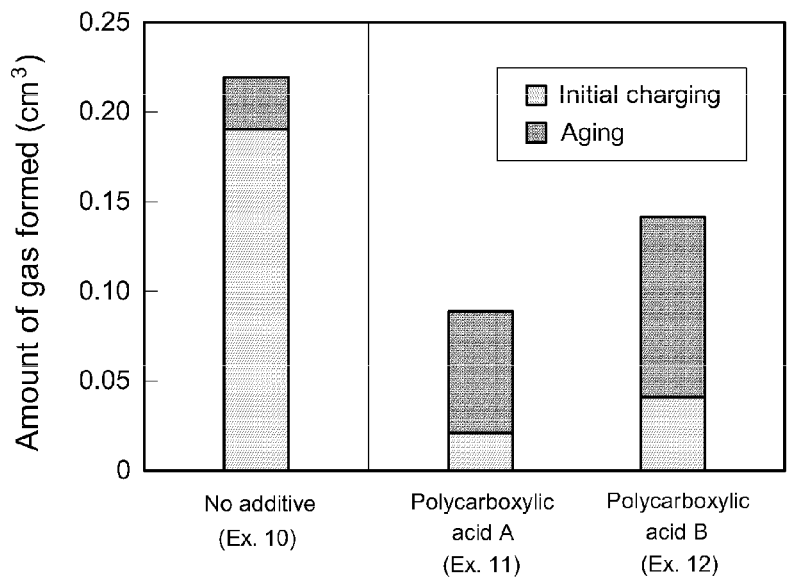
FIG. 6 shows a graph representing the relationship between the type of gas formation inhibitor and the amount of gas formed when LPFO was used as the oxalato complex.

FIG. 6 shows a graph representing the relationship between the type of gas formation inhibitor and the amount of gas formed in the activation process. As evident from FIG. 6, with respect to Example 11 supplemented with polycarboxylic acid A and Example 12 supplemented with polycarboxylic acid B (polyacrylic acid), significantly smaller amounts of gas were formed in the activation process as compared with Example 10.

Figure 7:
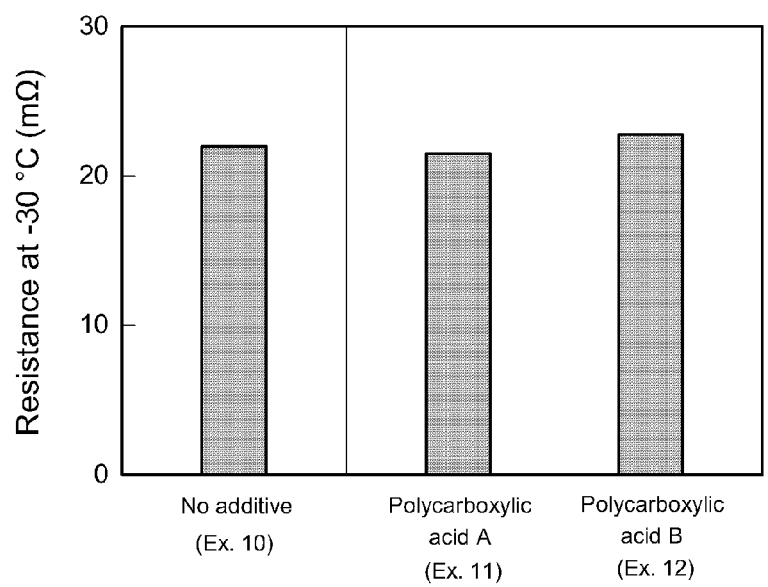
FIG. 7 shows a graph representing the relationship between the type of gas formation inhibitor and the battery resistance at −30° C. when LPFO was used as the oxalato complex.

FIG. 7 shows a graph representing the relationship between the type of gas formation inhibitor and the battery resistance at –30° C. As evident from FIG. 7, in all examples, the battery resistance was more or less equal, and the amount of gas formed in the battery production was reduced without degradation of battery properties.

Although the present invention has been described in detail above, the described embodiments and working examples are merely for illustrations. The invention disclosed herein includes various modifications and changes made to the specific embodiments illustrated above.

REFERENCE SIGNS LIST 10 positive electrode sheet (positive electrode)
14 positive electrode active material layer
20 negative electrode sheet (negative electrode)
24 negative electrode active material layer
40 separator sheet (separator)
50 battery case
52 main battery casing
54 lid
55 safety valve
70 positive terminal
72 negative terminal
80 wound electrode body
100 non-aqueous secondary battery

The invention claimed is:

1. A method for producing a non-aqueous secondary battery, the method comprising:
    preparing a negative electrode paste comprising a negative electrode active material, a binder, and a polycarboxylic acid-based gas formation inhibitor;
    fabricating a negative electrode by applying the negative electrode paste to a surface of a negative current collector;
    constructing an assembly with a positive electrode, the negative electrode, and a non-aqueous electrolyte solution comprising an oxalato complex; and
    subjecting the assembly to an activation process thereby to decompose the oxalato complex and forming a coating derived from the oxalato complex on a surface of the negative electrode while inhibiting gas formation by the effect of the gas formation inhibitor.

2. The production method according to claim 1, wherein the gas formation inhibitor is included in 0.1 part by mass or more relative to 100 parts by mass of the negative electrode active material.

3. The production method according to claim 1, wherein the gas formation inhibitor is included in 0.3 part by mass or less relative to 100 parts by mass of the negative electrode active material.

4. The production method according to claim 1, using, as the gas formation inhibitor, a species having a weight average molecular weight of 1000 to 20000 based on gel chromatography.

5. The production method according to claim 1, using, as the negative electrode active material, a graphitic carbon material.

6. The production method according to claim 1, using, as the binder, a rubber and a cellulose-based polymer.

7. The production method according to claim 6, wherein the preparing the negative electrode paste includes:
    a first mixing step where the negative electrode active material and the gas formation inhibitor are mixed;
    a second mixing step where the cellulose-based polymer is added to the first mixture obtained in the first mixing step and further mixed; and
    a third mixing step where the rubber is added to the second mixture obtained in the second mixing step and further mixed.

8. The production method according to claim 1, wherein, as the oxalato complex, at least either lithium bis(oxalato)borate or lithium difluorobis(oxalato)phosphate is used and the oxalato complex is added in an amount of 0.3% by mass or greater to the non-aqueous electrolyte solution.

9. A non-aqueous secondary battery comprising a positive electrode, a negative electrode and a non-aqueous electrolyte solution, wherein
    the negative electrode comprises a negative electrode active material, a binder, a polycarboxylic acid-based gas formation inhibitor; and has an oxalato complex-derived coating on a surface thereof.

10. The non-aqueous secondary battery according to claim 9, wherein the non-aqueous electrolyte solution comprises an oxalato complex.

11. The non-aqueous secondary battery according to claim 9, wherein the gas formation inhibitor content is 0.1 part by mass or greater, but 0.3 part by mass or less relative to 100 parts by mass of the negative electrode active material.

* * * * *